Patented May 30, 1939

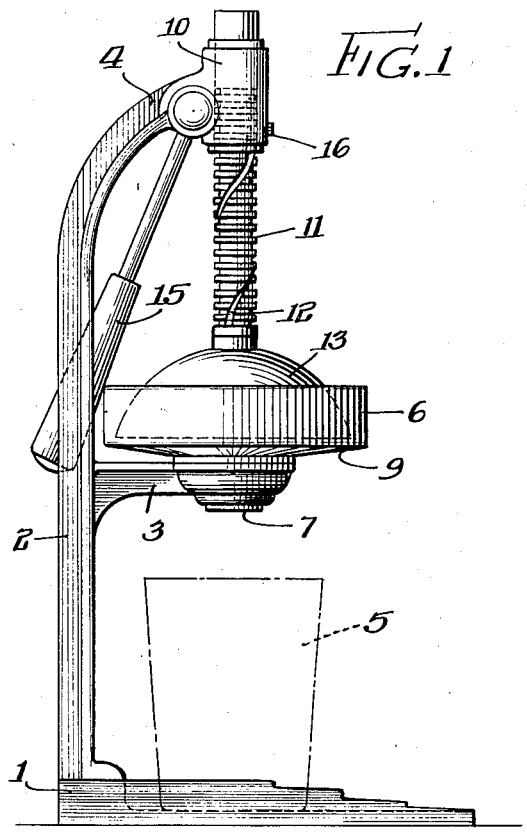
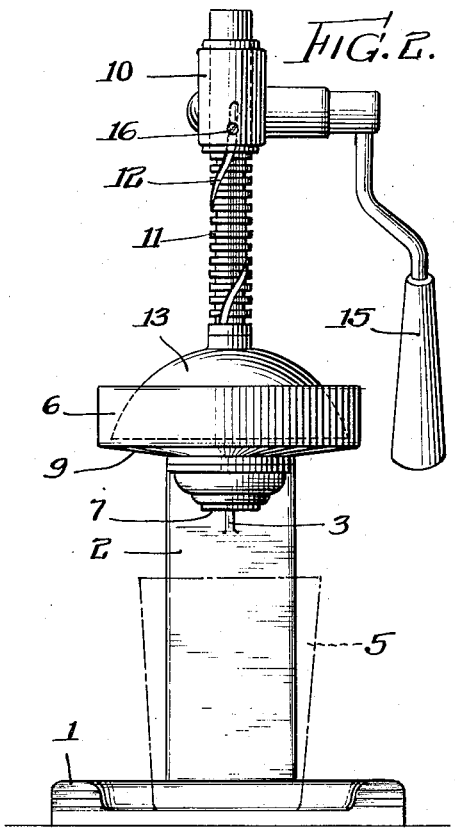
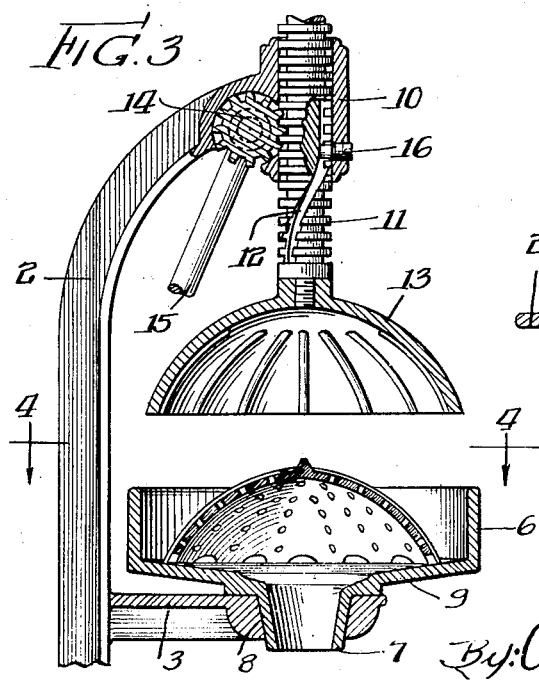
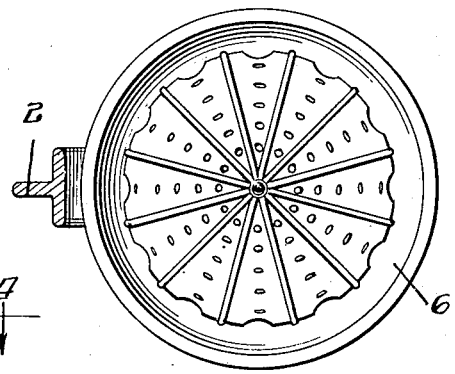

2,160,523

UNITED STATES PATENT OFFICE 2,160,523

JUICE EXTRACTOR

Lewis H. Scurlock, Chicago, Ill.

Application July 17, 1937, Serial No. 154,145

6 Claims. (Cl. 146—3)

This invention relates to machines or devices for extracting the juice from oranges and lemons and other kinds of fruit.

Generally stated, the object of the invention is to provide a novel and improved construction and arrangement whereby the movable member of a juice extractor, of the kind having a stationary member for receiving the fruit, is operated by a rack and pinion, to cause axial movement of the movable member, and whereby a spiral groove is provided to cause said movable member to rotate about its axis while approaching said stationary member, thereby to more effectively extract the juice from the fruit.

It is also an object to provide certain details and features of construction and combinations tending to increase the general efficiency and desirability of a fruit juice extractor of this particular character.

To the foregoing and other useful ends, the invention consists in matters hereinafter set forth and claimed and shown in the accompanying drawing, in which—

Fig. 1 is a side elevation of a fruit juice extractor embodying the principles of the invention.

Fig. 2 is a front elevation of the said extractor.

Fig. 3 is a sectional view, on a larger scale, of certain portions of said extractor.

Fig. 4 is a horizontal section on line 4—4 in Fig. 3 of the drawing.

As thus illustrated, referring to Figs. 1 to 4, inclusive, the invention comprises a stationary base or support 1 upon which the upright portion 2 is supported, this upright portion having a lower arm 3, and an upper arm 4, as shown. The base 1 is adapted to receive a cup or other container 5, for receiving the juice.

The arm 3 is provided with a removable cup 6 having a discharge spout 7 on the bottom thereof, which spout removably fits an opening 8 in the said arm. The perforated cone 9 is removably held in said cup, to engage the flat side of an orange half, or a lemon half, in the ordinary manner.

The upper arm 4 has a vertical sleeve portion 10, in which the cylindrical rack 11 is movable up and down, this rack having separately formed circumferential annular teeth, and having a spiral groove 12, as shown. The inverted cup 13 is suitably fastened to the lower end of said rack, and the latter is moved up and down by the pinion 14, suitably journaled in the arm 1 and provided with a handle 15 for the operation thereof. A screw 16 is inserted in the sleeve 4 to engage the groove 12 in the manner shown.

When the handle 15 is operated in a manner to cause the rack to move downwardly, the screw 16 and the spiral groove 12 cooperate to cause the inverted movable cup 13 to rotate about the axis thereof, so that the fruit is subjected to both axial downward movement of the movable cup 13, and to rotation of the latter, thus more effectively extracting the juice from the fruit.

While the drawing shows the cylindrical rack member 11 in vertical position, it is obvious that it can be used more or less horizontally, if desired.

The combination of the two movements, it will be understood, is more effective to extract the juice from the fruit, as the orange half, or lemon half, or other fruit, is not only subjected to direct pressure and compression, but is also subjected to a rotational rubbing action by the rotation of the movable pressure member, because the cylindrical rack with annular teeth can rotate on the pinion, and can do this while held by the pinion against axial movement, so far as the relative engagement itself is concerned, for the teeth are annular and separate, and only the spiral groove and its engaging pin cause the rotation of the rack and the movable compression member.

Thus in each form of the invention the groove is disposed laterally of and parallel with the row of rack teeth. Also, in each form of the invention, the removable screw for engaging the groove is at all times in engagement with some portion thereof. Obviously, the groove may be formed to provide the desired amount of rotation of the movable pressure member, but as specifically shown it provides rotation for the full stroke of said member.

What I claim as my invention is:

1. A fruit juice extractor comprising a movable compression member operated axially and rotatively by a rack and pinion device, the latter comprising a cylindrical rotary rack member having separate annular teeth spaced apart and each in effect being an annular ring, with separate annular spaces between them, a pinion mounted to engage said rack, the latter being adapted to rotate while held against axial movement by said pinion, so far as the relative engagement of the rack and pinion is concerned, means for operating said pinion, and provisions for causing rotation of the rack by the axial movement thereof, thereby causing said compression member to rotate while moving axially to compress the fruit.

2. A structure as specified in claim 1, said provisions comprising a spiral groove on said rack, formed about the axis of the latter, cutting through said teeth, and a fixed means to engage said groove.

3. A structure as specified in claim 1, said provisions comprising a spiral groove on said rack member, formed about the axis of the latter, and a fixed means to engage said groove.

4. A structure as specified in claim 1, said compression member being concave.

5. A structure as specified in claim 1, said compression member being convex.

6. A structure as specified in claim 1, said teeth being formed in parallel planes fixed relatively to each other, with the axis of said rack member extending at right angles to said planes.

LEWIS H. SCURLOCK.